No. 843,340. PATENTED FEB. 5, 1907.
W. P. HUSSEY.
TRUCK.
APPLICATION FILED JULY 5, 1906.
Fig. 1.
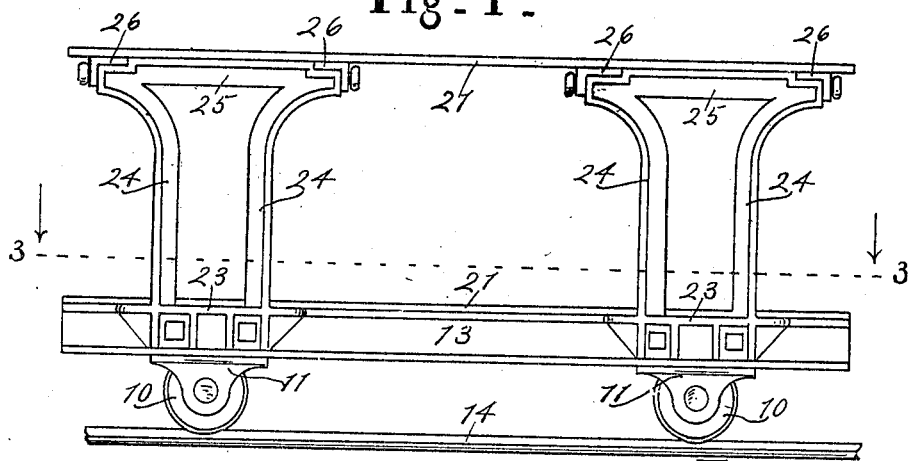
Fig. 2.
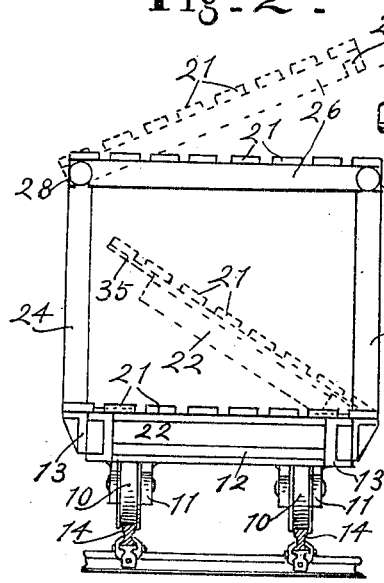
Fig. 3.
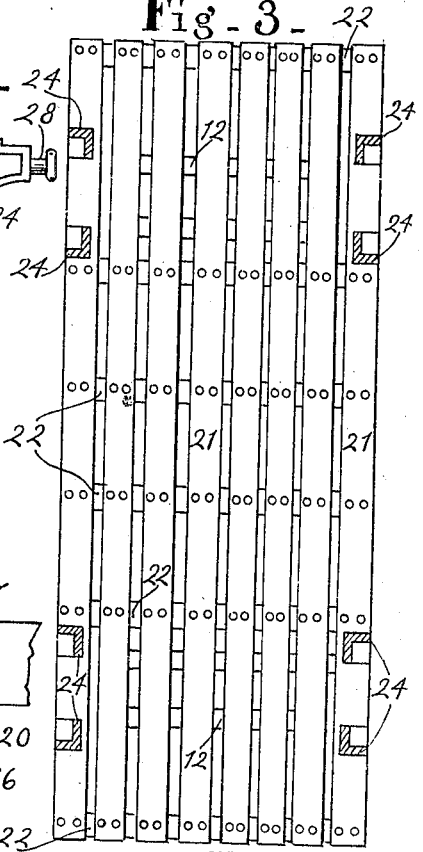
Fig. 4.
Fig. 5.
Fig. 6.
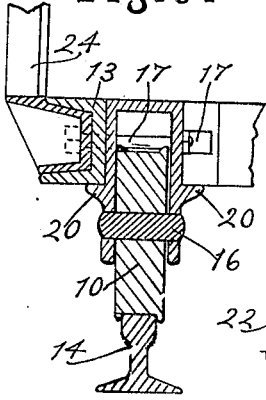
Fig. 7.
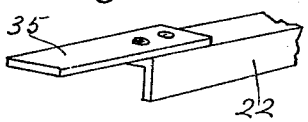
WITNESSES:
W. M. Gentle.
N. Allemong.
INVENTOR.
William P. Hussey
BY V. H. Lockwood
ATTORNEY.

UNITED STATES PATENT OFFICE.

WILLIAM P. HUSSEY, OF INDIANAPOLIS, INDIANA, ASSIGNOR TO THE STANDARD DRY KILN COMPANY, OF INDIANAPOLIS, INDIANA, A CORPORATION OF INDIANA.

TRUCK.

No. 843,340.　　　Specification of Letters Patent.　　　Patented Feb. 5, 1907.

Application filed July 5, 1906. Serial No. 324,750.

*To all whom it may concern:*

Be it known that I, WILLIAM P. HUSSEY, of Indianapolis, county of Marion, and State of Indiana, have invented a certain new and useful Truck; and I do hereby declare that the following is a full, clear, and exact description thereof, reference being had to the accompanying drawings, in which like numerals refer to like parts.

This invention relates to a double-deck truck designed especially as a brick-truck for use in driers and the like.

The object of the invention is to make the truck simple, strong, and economical in construction.

The full nature of the invention will be more fully understood from the accompanying drawings and the following description and claims.

Figure 1 is a side elevation of a truck. Fig. 2 is an end elevation thereof, tilted positions of the platform being shown by dotted lines. Fig. 3 is a section on the line 3 3 of Fig. 1, showing a plan view of the platform. Fig. 4 is a side elevation of the upper end of the upper support of the upper deck. Fig. 5 is a perspective view of the outer end of one of the cross-bars on the upper deck. Fig. 6 is a vertical section through the truck-wheels and associated parts, parts being broken away. Fig. 7 is a perspective view of one end of the cross-pieces on the lower platform.

The double-deck truck herein shown to illustrate the nature of my invention has for its lower portion a truck formed substantially like that shown and described in a former patent granted on my application on January 31, 1905, No. 781,427. It is made up of four elements or parts—wheels 10, housings 11, cross-bars 12, and side bars 13. There are four wheels, four housings, four cross-bars, and two side bars.

The wheels are on spindles 16 and are double-flanged to run on track-rails 14. The housings 11 are skeleton frames made of metal having a closed top, two open skeleton-like sides with downward central extensions for the mounting of the wheel. The housings have ledges 20 along the outer side thereof, upon which cross-bars 12 and side bars 13 may rest.

The cross-bars and side bars are made of channel-iron and are bolted to the housings by bolts 17. The tops of the side bars and cross-bars and boxes are all flush, making a smooth top surface for the truck.

In assembling, the housings are first provided with the wheels. Then the cross-bars are secured in place, making two small two-wheel trucks. The parts of the entire truck are shipped in this way without further assembling, so that they may be packed in close compact form. At the place of use the side bars 13 are bolted to the ends of the two constructions previously assembled.

Upon the foregoing-described truck-base I place a removable plate or platform consisting of a series of longitudinal bars 21 about the width of a brick and spaced from each other and secured to four cross-bars 22. These cross-bars have extensions 35, that rest on the side bars of the truck.

To support the upper-deck crate or platform, I provide four double leg-supports, as shown in Fig. 1, these supports consisting of a horizontal lower portion 23, two legs 24, that are curved away from each other at their upper ends to widen the support and are secured to an upper cross-bar 25. The bars 23, 24, and 25 are preferably one casting. The supports are secured to the truck-base by the bolts 17, so that these bolts secure said supports, the side bars 13, and the housings 11 together.

The upper ends of the legs or supports referred to are widened to distribute uniformly the supporting-points for the upper deck or platform. This upper deck or platform is made substantially like the lower one, consisting of longitudinal bars or slats 21, secured to four cross-bars 26, equidistant from each other. Its cross-bars have at each end a notch 27 on the under side to enable said bars to engage the headed pins 28 on each side of the upper widened portion of each support for the upper deck. In this way the upper deck is supported and held in position. With this arrangement the upper deck can be readily removed or, what is of still more value, be elevated or tipped, so as to readily gain access to the brick on the lower crate or platform and for loading and unloading said lower crate or platform. It is observed that the means for supporting the upper deck are strong, symmetrical, and distribute the load and are readily removable from the truck if only the lower platform is to be used. This enables the device to be used as single or double deck truck, and as double-deck truck it is very strong and well placed. The upper platform cannot escape by reason of notches 27 engaging the heads of the pins 28. The lower platform cannot escape, as the side bars are notched to engage the legs 24 of the various supports.

What I claim as my invention, and desire to secure by Letters Patent, is—

1. The combination with the wheels and frame of a truck, of an upper deck or platform consisting of longitudinal bars secured to cross-bars substantially equidistant from each other, supports secured to the frame of the truck widened at the upper end, and means at each side of the upper end of said support for supporting said cross-bars on said upper deck or platform whereby the weight of said deck or platform will be evenly distributed.

2. In a double-deck truck having wheels, the combination with a frame, and a lower platform, of an upper platform having cross-bars with hook-shaped ends, and supports for said upper platform that at their lower ends are secured to the truck-frame and at their upper ends have pins to be engaged by the hook-shaped ends of the cross-bars of the upper platform whereby said upper platform may be readily removed or tilted.

In witness whereof I have hereunto affixed my signature in the presence of the witnesses herein named.

WILLIAM P. HUSSEY.

Witnesses:
 HELEN B. McCORD,
 N. ALLEMONG.